(12) United States Patent
Bultmann et al.

(10) Patent No.: US 6,292,819 B1
(45) Date of Patent: Sep. 18, 2001

(54) BINARY AND DECIMAL ADDER UNIT

(75) Inventors: Wolfgang Bultmann, Böblingen; Wilhelm Haller, Remshalden; Holger Wetter, Böblingen; Alexander Wörner, Waiblingen, all of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/235,028

(22) Filed: Jan. 21, 1999

(30) Foreign Application Priority Data

Sep. 4, 1998 (EP) .................................. 98116752

(51) Int. Cl.[7] .................................................. G06F 7/50
(52) U.S. Cl. ............................................................. 708/673
(58) Field of Search .................................. 708/771, 772, 708/673, 674, 670

(56) References Cited

U.S. PATENT DOCUMENTS

| | | | |
|---|---|---|---|
| 5,007,010 | * | 4/1991 | Flora ..................................... 708/673 |
| 5,146,423 | * | 9/1992 | Fischer et al. ........................ 708/673 |
| 5,745,399 | * | 4/1998 | Eaton et al. .......................... 708/673 |
| 5,928,319 | * | 7/1999 | Haller et al. ......................... 708/673 |

OTHER PUBLICATIONS

Schmookler et al., "High Speed Decimal Addition," IEEE Transactions on Computers, vol. 20, No. 8, 8/71, pp. 862–868.

* cited by examiner

Primary Examiner—Chuong Dinh Ngo
(74) Attorney, Agent, or Firm—Lynn L. Augspurger (57) ABSTRACT

A binary and decimal adder unit uses a pre-sum logic for generating pre-sums of the operands A, B under the presumption of one and zero carry inputs into the decimal digit position, and also uses a digits carry network for generating binary carries within the decimal digit positions and a high order carry out signal of said plurality of decimal digits. Each decimal digit position of said adder unit provides a six correction and a pre-sum selection. The pre-sum logic comprises a carry prediction logic for generating decimal digit position carry out signals on the presumption of a zero carry input and of a one carry input into the decimal digit. In response to gating signals derived from the carry out signals of the carry prediction logic and operation control signals a pre-selection is performed for selecting a qualified pre-sum generated on the presumption of a zero carry input into the decimal digit, and for selecting a qualified pre-sum generated on the presumption of a one carry input into the decimal digit. The pre-selection of the qualified pre-sums is performed for all decimal digit positions in parallel to the generation and distribution of the carries in the digits carry network over the total of decimal digit positions. The pre-sum selection logic further comprises a two way selector which is responsive to a digit carry-in signal from the digits carry network for selecting one the qualified pre-sums as the correct sum of the digit position. According to one embodiment of the invention, the pre-sum logic generates six corrected pre-sums which are included in the pre-selection of qualified pre-sums.

20 Claims, 6 Drawing Sheets

BINARY AND DECIMAL ADDER UNIT

FIELD OF THE INVENTION

The invention relates to a binary and decimal adder unit for high speed additions and subtractions of operands having a plurality of binary and decimal digit positions.

BACKGROUND OF THE INVENTION

Several techniques of designing adder units for performing high speed additions of decimal operands consisting of a plurality of decimal digits are disclosed by Schmookler and Weinberger in "High Speed Decimal Addition", IEEE Transactions on Computers, Volume 20, No. 8, August 1971, pages 862–866. These techniques provide a direct production of decimal sums without the need of first producing the binary sums, and they avoid the decimal correction of the result in an additional operation cycle by adding six to each sum digit where a carry is produced. The techniques use carry generate and propagate functions for the decimal digits to perform a carry look ahead function over the digit positions and for the direct production of the decimal sum digits.

A combined binary/decimal adder unit using a carry look ahead logic through a plurality of decimal digit positions and a direct production of the decimal sum digits is disclosed in the U.S. patent application Ser. No. 969.244, Haller et al, "Combined Binary/Decimal Adder Unit". In this unit pre-sums are generated for each decimal digit position in parallel to the generation and distribution of the carries over the total of decimal digit positions of the adder unit. The pre-sums anticipate the carry-in of the decimal positions and the need to perform six corrections after the carry-out signal of the highest decimal digit position has been generated. The carry-out signal of each decimal digit position is used in combination with operation control signals to select the correct pre-sum of the digit position.

The time critical path of the add and subtract operations resides in the highest decimal digit position for which the carry-in signal is generated at the end of the carry processing operation. Re-corrections of the sums and differences by −6 corrections would require an additional operation delay which limits cycle rate of the processor unit in which the decimal additions and subtractions have to be performed. The previous unit avoids such additional operation delay but still requires some circuit level delay for the selection of the pre-sum selection.

SUMMARY OF THE INVENTION

It is an object of the invention to further reduce the operation delay of decimal additions and subtractions in a binary and decimal adder unit which uses the generation and selection of pre-sums. Another object is to permit an increased cycle rate of the processor unit in which such binary and decimal adder unit is utilized. Still another object of the invention is to reduce the circuitry and the chip area required for the binary and decimal adder unit. The invention is defined in the claims.

The binary and decimal adder unit according to the invention provides a pre-sum logic which comprises a carry prediction logic for generating decimal digit position carry out signals on the presumption of a zero carry input and of a one carry input into the decimal digit. In response to gating signals derived from the carry out signals of the carry prediction logic and to operation control signals a sum digit pre-selection is performed for selecting a qualified pre-sum digit generated on the presumption of a zero carry input into the decimal digit position, and for selecting a qualified pre-sum generated on the presumption of a one carry input into the decimal digit position. The pre-sum selection logic also comprises a two way selector which is responsive to the digit carry-in signals from the digits carry network for selecting one of the qualified pre- sum digits as the correct sum of each digit position.

The pre-selection is performed for all decimal digit positions in parallel to the generation and distribution of the carries in the digits carry network and anticipates the carry-in of the decimal digit positions. The most time critical selection of the qualified pre-sum digits as correct sum output is performed by means of the carry-in signal into the high order decimal position, and the circuit delay required for this time critical selection is reduced to one multiplexer level.

According to one embodiment of the invention, the sum pre-selection is extended to true and modified pre-sums to reduce the circuitry of generating pre-sums. In the adder unit of this embodiment the operand modification is applied only to one of the operands by selecting one of the operands as true operand, as its complement and as a six incremented version of said one operand while the other operand is supplied in the true form only. A first pre-sum logic circuit is provided for generating a sum of the uncorrected operand and the six incremented operand and a difference of the uncorrected operands in each of the decimal digit positions under the presumption of a zero carry input into the decimal digit position, and a second pre-sum logic circuit is provided for generating a sum of the uncorrected operand and the six incremented operand and a difference of the uncorrected operands in each of the decimal digit positions under the presumption of a one carry input into the decimal digit position. Each of the pre-sum logic circuits is connected to a modification logic which applies a six decrement operation to the pre-sum outputs of the pre- sum logic circuits. The pre-selection logic then selects the unmodified or the decremented pre-sums as qualified pre- sums. This embodiment of the invention reduces the extent of circuitry required for the pre-sum generation and also reduces the chip space required for the binary and decimal adder unit.

BRIEF DESCRIPTION OF THE DRAWINGS

In the following two embodiments of the adder unit according to the invention are described with reference to drawings which show.

DETAILED DESCRIPTION A PREFERRED EMBODIMENT OF THE INVENTION

Figure 1:
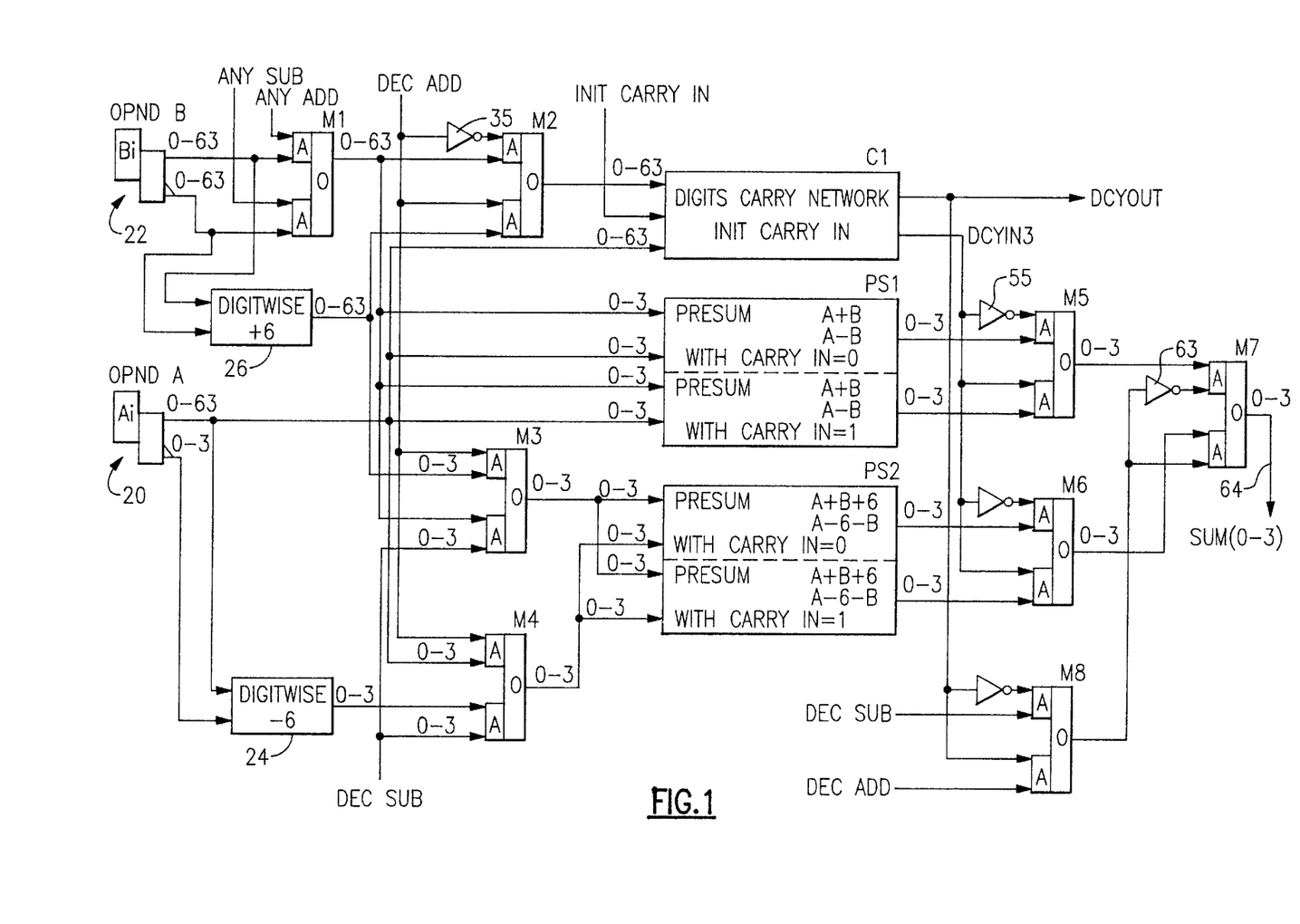
FIG. 1 a block diagram of a combined binary/decimal adder unit according to the prior art.

The combined binary/decimal adder unit shown in FIG. 1 is disclosed in the U.S. patent application Ser. No. 969.244, Haller et al, "Combined Binary/Decimal Adder Unit", which is incorporated herein by reference. The adder unit contains 16 decimal digit positions each receiving one decimal digit of the operands A, B and generating one decimal digit of the result SUM. Accordingly, the adder unit comprises 64 bit positions 0–63 which are subdivided into 8 Bytes. Each byte represents two decimal digits each consisting of 4 bits.

The digit position represented by the bits 60–63 is the low order digit position which is assigned to the least significant decimal digit, and the digit position represented by the digits 0–3 is the high order digit position which is assigned to the most significant decimal digit. Each digit position receives a carry signal DCy-in from the next lower digit position and supplies a carry-out signal DCy-out to the next higher digit position. The least significant digit position receives an initial carry signal INITCY-In which is 1 if a subtraction has to be performed. For binary operations the decimal digit groups and the byte boundaries are ignored and the 64 bits of the unit represent a consecutive sequence of 64 binary bit positions.

FIG. 1 shows the high order decimal digit position of the adder unit which receives the bits 0–3 of the most significant digits of operands A and B and which further receives an initial carry-in signal DCy_in from the next lower digit position represented by the bits 4–7. FIG. 1 further shows those parts of the adder unit which are common to all digits of the adder unit. These common parts comprise operand registers 20, 22, multiplexers M1 and M2, an operand increment circuit 26 and a digits carry network C1 which receives the bits 0–63 of the decimal digit positions 0 . . . 15. At the input and output connections of each components shown in FIG. 1 the numbers of the bit positions are indicated which are relevant to that component.

The addition/subtraction is based on the following conventional rules:
Decimal ADD/SUB:
　Ai+Bi=Ai+6+Bi if DCy=1
　Ai+Bi=Ai+6+Bi–6 if DCy=0
　Ai–Bi=Ai–Bi if DCy=1
　Ai–Bi=Ai–Bi–6 if DCy=0
Binary ADD/SUB:
　Ai+Bi=Ai+Bi
　Ai–Bi=Ai–Bi
where i denotes the digit positions (0 . . . 15). The longest path through the logic is required for decimal additions/subtractions and includes:
　one of the operands is digitwise incremented by +6,
　operands Ai, Bi are added/subtracted where the carry processing is most timing critical,
　depending on the carry-out of each digit, the result is digitwise decreased by –6.

According the adder unit of FIG. 1 the rules for the decimal addition/subtraction are modified as follows while the rules for the binary addition/subtraction remain as indicated above:
Decimal ADD/SUB:
　Ai+Bi=Ai+Bi+6 if DCy_out=1
　Ai+Bi=Ai+Bi if DCy_out=0
　Ai–Bi=Ai–Bi if DCy_out=1
　Ai–Bi=Ai–6–Bi if DCy_out=0
where these sums and differences are generated in parallel as pre-sums or pre-differences during the processing of the digit carries, and for each digit the digit carry DCy-out signal generated is used to select one of the pre-sums or pre-differences as the correct sum or difference.

A minus six decrementer 24 is connected to operand register 20 to generate a –6 decrement of operand digit A. Similarly, a plus six incrementer 26 is connected to operand register 22 to generate a +6 increment of operand digit B.

The output of operand register 22 is also connected to multiplexer M1 which receives an operation control signal ANY-SUB to select the complement output of operand register 22 and to gate it to the output of M1 in case of a subtraction, and which receives an operation control signal ANY-ADD to select the true output of operand register 22 and to gate it to the output of M1 in case of an addition. The control signals ANY-SUB and ANY-ADD are generated by an operation decoder not shown which supplies at a certain point of time either the control signals ANY-ADD or the control signal ANY-SUB. Multiplexer M1 supplies the bits 0–63 of the selected representation of operand B the to a multiplexer M2 which also receives the incremented version of operand B from incrementer 26. Multiplexer M2 is controlled by an operation control signal DEC-ADD requesting a decimal addition. If signal DEC-ADD is present, the incremented operand B is gated to the digits carry network 34 while an absence of the signal DEC-ADD as indicated by inverter 35 controls a transfer of the true or complemented operand B from the output of multiplexer M1 to the digits carry logic 34. The digits carry network 34 further receives operand A from register 20 and an initial carry-in signal INIT-CARRY-IN.

The digits carry network C1 operates according to the conventional carry look ahead techniques by using generate functions Gi and propagate functions Pi of the operand bits to generate a DCyOut signal of the high order digit position. Furthermore, digits carry network C1 generates digit-in carries for each of the decimal digit positions such as the carry DCyIn3 which is the carry-in signal from the bit position 4 into the low order bit position 3 of the most significant decimal digit. The initial carry in signal INIT-CARRY-IN is the carry into the least significant digit position digits carry network C1 and is used to generate the 2's complement for performing subtractions.

The output of multiplexer M1 is further connected to a pre-sum logic PS1 and via a multiplexer M3 to a pre-sum logic PS2. Similarly, the output of operand register 20 is connected to pre-sum logic PS1 and via a multiplexer M4 to pre-sum logic PS2. Multiplexer M4 also connects the output of the decrementer 24 to pre-sum logic PS2, and multiplexer M3 connects the output of the incrementer 26 to pre-sum logic PS2. The multiplexer M3 and M4 are controlled by the operation control signal DEC-ADD to gate operand A and the +6 version of operand B to pre-sum logic PS2, and by an operation control signal DEC-SUB to gate the –6 version of operand A and the complement of operand B to pre-sum logic PS2.

Depending on the operand version received, the pre-sum logic PS1 generates from the operand digit pair preliminary results Ai+Bi or Ai–Bi on the assumption that the carry input of the digit position is zero (DCyIn=0) and further generates the preliminary results Ai+Bi or A–Bi on the assumption that the carry input of this digit position is one (DCyIn=1). The pre-sum logic PS1 of FIG. 1 is assigned to the high order decimal digit and processes the bits 0–3 of the operand version received from operand registers 20 and multiplexer M1. Similarly, pre-sum logic circuit PS2 generates from the operand version received the preliminary results Ai+Bi+6 and Ai–6–Bi on the assumption that the carry input of this digit position is zero (DCyIn=0), and further generates the preliminary results Ai+Bi+6 and Ai–6–Bi on the assumption that the carry input of this digit position is one (DCyIn=1).

Also the pre-sum logic PS2 of FIG. 1 is assigned to the high order decimal digit and processes the bits 0–3 of the operand version received from operand registers 20, 22, decrementer 24 and incrementer 26 and selected by multiplexers M1, M3 and M4 as previously described. An implementation of the pre-sum logic PS1 and PS2 is described later with reference to FIG. 3.

The pre-sum logic blocks PS1 and PS2 are arranged in parallel with each other and in parallel to the digits carry network C1. Thus, these three circuits operate simultaneously in generating the digits carries and said pre-sums. During their operations the total time requirement of the digits carry network C1 to produce the hot carry-out DCy-Out of the high digit order is the critical factor for the operation speed of the adder unit. While in each digit position the carry-out of network C1 is used to select one of the pre-sums as the correct sum of the corresponding digit position, the high order digit position represented in FIG. 1 has to wait until the hot carry-out DCyOut is available.

The pre-sum selection is performed by means of multiplexers M5-M8. Multiplexer M5 selects one of the pre-sums A+B and A–B from pre-sum logic PS1 depending on the carry DCyIn3 provided by the digits carry network C1 into the digit position shown. If DCyIn3=1, multiplexer M5 selects the pre-sum formed with an assumed carry-in=1, and if DCyIn3=0, which is indicated by an inverter 55, multiplexer M5 selects the pre-sum formed with an assumed carry-in=0. Similarly, multiplexer M6 selects the pre-sum generated by logic PS2 with an assumed carry-in=1 if DCyIn3=1, and selects the pre-sum generated by logic PS2 with an assumed carry-in=0 if the DCyIn3=0.

Multiplexer M7 selects one of the pre-sums gated through the multiplexers M5 and M6. Multiplexer M7 is controlled by the output of multiplexer M8 depending on the digit position carry-out signals generated by the digits carry network C1 for each digit position, and depending on the operation control signals DEC-ADD and DEC-SUB. In the high order digit position shown in FIG. 1 the hot carry DCyOut generated by the digits carry network C1 for the high order digit is used to control multiplexer M7 via multiplexer M8. If the hot carry DCyOut=1 and operation control signal DEC-ADD requests a decimal addition, the pre-sum from the output of multiplexer M6 is selected by multiplexer M7 and gated to the sum output 64 as the correct SUM(0–3) of the high order of digit position. If on the other hand the hot carry DCyOut=1 and operation control signal DEC-SUB requests a decimal subtraction, the pre-sum from the output of multiplexer M5 is selected by multiplexer M7 due to the function of an inverter 63 and gated to the sum output 64 as the correct SUM(0–3) of the high order of digit position.

With regard to the binary addition and subtraction it is noted that these operations are exclusively controlled by the control signals ANY_ADD, ANY_SUB. In these cases the control signals DEC_ADD, DEC_SUB do not appear and the decrementer 24, incrementer 26, pre-sum logic PS2 and multiplexers M3, M4, M6 and M8 have no function.

As described with reference to FIG. 1 the pre-sum selection in the high order digit position depends on the availability of the hot carry-out DCyOut from the digits carry network C1. After the hot carry is available it takes two multiplexer levels to select one of the pre-sums as the correct sum which selection operation requires operation time in the most critical time phase of an decimal addition or subtraction. In addition, the fan-out of the carry signals delivered by the digits carry network C1 is high which further impacts the signal distribution speed in the network C1.

The situation is improved by an embodiment according to the invention as shown in FIGS. 2–5. The adder unit of FIG. 2 comprises a number of circuit components which correspond to circuit components of FIG. 1 where corresponding circuit components are designated with identical reference numbers. Accordingly, the operand registers 20, 22, the generation of the required operand versions by means of decrementer 24, incrementer 26 and multiplexer M1, and the operand selection by means of multiplexer M2–M4 are equivalent to FIG. 1. Also the digits carry network C1 corresponds to the digits carry network C1 of FIG. 1. The adder unit of FIG. 2 uses a modified pre-sum logic PS10 and PS20 comprising a carry prediction function, and a sum pre-selection logic.

Figure 2:
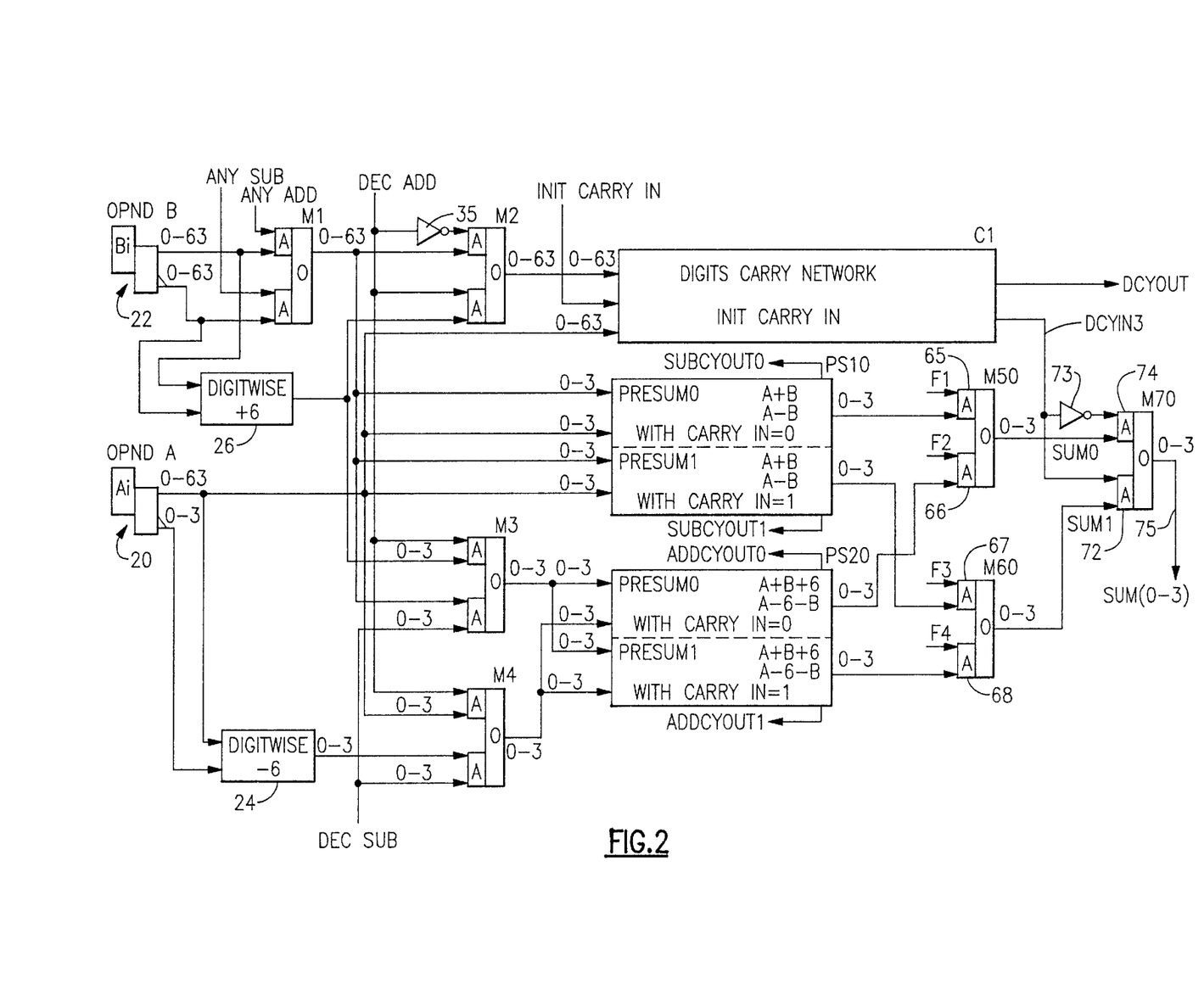
FIG. 2 a block diagram of a decimal adder unit according to a first embodiment of the invention.

The pre-sum logic circuits PS10 and PS20 predict the raw carries and raw sums of the digits, and additionally predict the raw carries coming out of each digit positions. This is shown in FIG. 2 only for the high order digit while the other digit positions are equally arranged.

The applied rules for each of the operand digits Ai, Bi are:
Decimal Add: $Ai+Bi=Ai+Bi+6$ if CyOut=1
$Ai+Bi=Ai+Bi$ if CyOut=0
Decimal Sub: $Ai-Bi=Ai-Bi-6$ if CyOut=0
$Ai-Bi=Ai-Bi$ if CyOut=1

The pre-sum logic blocks PS10 and PS20 generate for each digit $Di(0 \ldots 3)$, $i=0 \ldots 15$, the predicted result $SUM0(0..3)$ and $SUM1(0 \ldots 3)$. The pre-sum logic blocks also generate digit-carry-out 0 and the digit-carry-out 1 signals. For decimal additions the pre-sum logic circuit block PS20 predicts AddCyOut0 and AddCyOut1, based on the assumed digit carry-in equals 0 or 1, respectively. The inputs to circuit block PS20 are A and B+6 and thus appropriate for the decimal addition. The pre-sum logic circuit block PS10 has the inputs A and the complement of B which is required for the decimal subtraction. SubCyOut0 and SubCyOut1 are the predicted carries out of the digits. This is again based on the assumption of digit carry-in equals 0 or 1, respectively.

Each of the pre-sum logic blocks PS10 and PS20 implement the following logical functions, where Cyi is the carry into bit position i and Gi is the generate function of bit position and Pi is the propagate function of bit position i:
CyIn assumed to be 0:

| | |
|---|---|
| Cy3=0 | Eq1 |
| Cy2=G3 | Eq2 |
| Cy1=G2 or (G3 & P2) | Eq3 |
| Cy0=G1 or (G2 & P1) or (G3 & P1 & P2) | Eq4 |
| CyOut0=G0 or(G1 & P0)or(G2 & P0 & P1) or(G3 & P0 & P1 & P2) | Eq5 |
| Sum0(3)=A3 xor B3 | Eq6 |
| Sum0(2)=A2 xor B2 xor Cy2 | Eq7 |
| Sum0(1)=A1 xor B1 xor Cy1 | Eq8 |
| Sum0(0)=A0 xor B0 xor Cy0 | Eq9 |

CyIn assumed to be 1:

| | |
|---|---|
| Cy3=1 | Eq10 |
| Cy2=P3 | Eq11 |
| Cy1=G2 or (P2 & P3) | Eq12 |
| Cy0=G1 or (G2 & P1) or (P1 & P1 & P2) | Eq13 |

CyOut1=G0 or(G1 & P0)or(G2 & P0 & P1) or(P0 & P1 & P2 & P3)  Eq14:

Sum1(3)=A3 xor B3  Eq15

Sum1(2)=A2 xor B2 xor Cy2  Eq16

Sum1(1)=A1 xor B1 xor Cy1  Eq17

Sum1(0)=A0 xor B0 xor Cy0  Eq18

Figure 3:
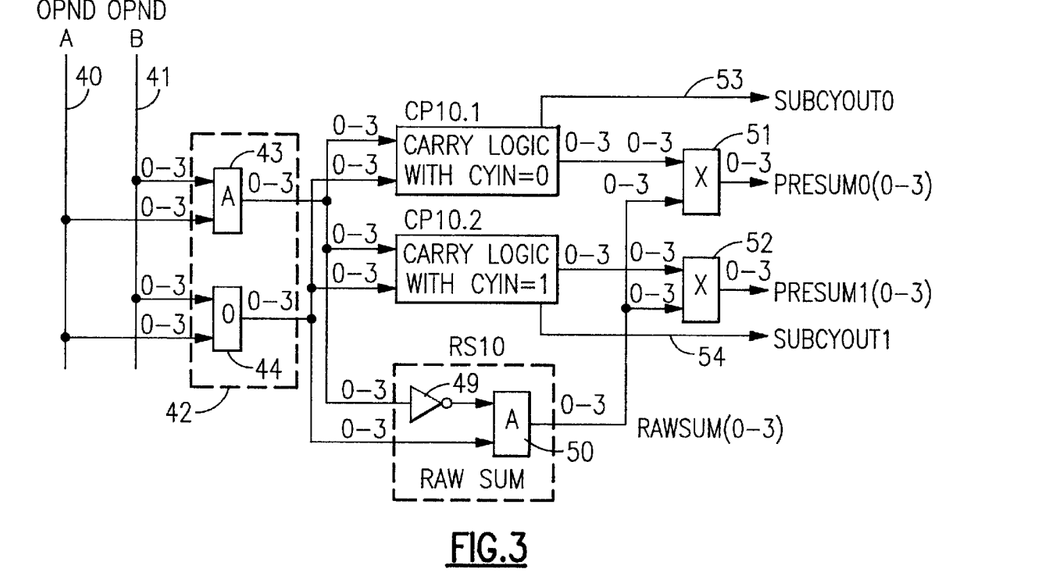
FIG. 3 an embodiment of the pre-sum logic as used in the unit of FIG. 2.

An implementation of the pre-sum logic block PS10 of the high order digit position is shown in FIG. 3. Via input lines 40, 41 the pre-sum-logic PS10 receives the high order digit of operands A and B in the selected version as described with reference to FIG. 1, i.e. the true, complemented, incremented or decremented operands. From these input a bit function circuit 42 produces the generate functions Gi by means of AND-circuits 43 and the propagate functions Pi by means of an OR-circuit 44. Both functions are supplied to carry prediction logic circuits CP10.1 and CP10.2 and a raw sum logic RS10. The carry prediction logic CP10. 1 performs a carry processing on the assumption that DCyIn=0 according to equations Eq1–Eq5. Carry prediction logic CP10.2 performs a carry processing on the assumption that DCyIn=1 according to equations Eq10–Eq14.

The raw sum logic RS10 implements the EXCLUSIVE OR function of the operands A and B as received on lines 40, 41 by inverter circuits 49 and AND-circuits 50 for inverting the generate functions Gi and AND-connecting the Pi functions and the inverted Gi functions as follows:

Ai xor Bi=Ai * Bi'+Ai'*Bi=(Ai*Bi)'* (Ai+Bi)=Gi'* Pi wherein i denotes the bits of the digit position and ' denotes the complement of the designated term.

XOR-circuits 51, 52 combine the outputs of the carry prediction logic circuits CP10. 1 and CP10. 2 and the outputs of the raw sum logic RS10 to generate PreSum0 and PreSum1 bits 0 . . 3 of the high order digit position according to the equations Eq6–Eq9 and Eq15–Eq18. The carry prediction logic circuits CP10.1 and CP10. 2 produce a predicted digit carry output SubCyOut0 and SubCyOut1 on lines 53, 54 according to equations Eq5 and Eq14 above.

Figure 4:
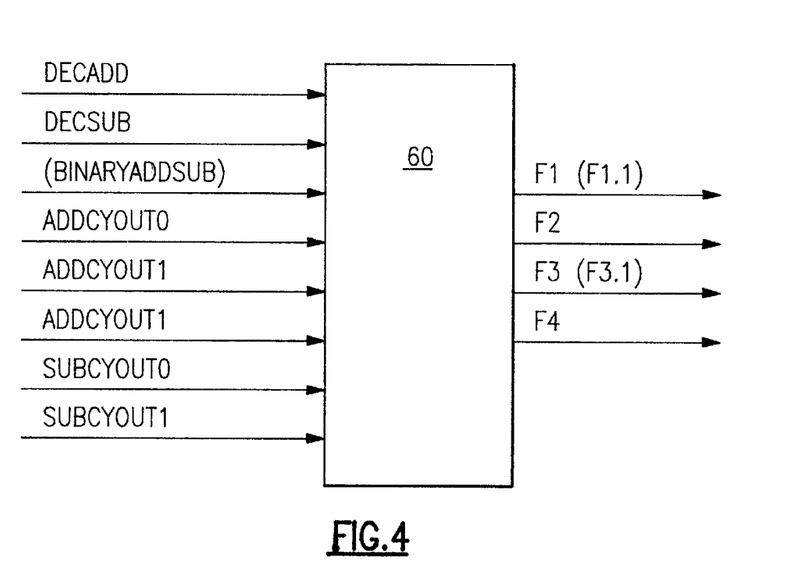
FIG. 4 a schematic representation of the logic for generating gating signals for the pre-selection of sums in the unit of FIG. 2.

The pre-sum logic block PS20 is identical with pre-sum logic block PS10 shown in FIG. 3 and performs the same functions according to equations Eq1–Eq18. Since the pre-sum logic block PS20 is used for decimal additions, the digit-carry-out outputs are designated AddCyOut0 and AddCyOut1. The digit carry outputs of the pre-sum logic blocks PS10 and PS20 are combined with the operation control signals DecAdd, DecSub by a logic circuit 60 (FIG. 4) according to the following functions F1–F4:

F1: (DecAdd & AddCyOut0=0) or (DecSub & SubCyOut0=1)

F2: (DecAdd & AddCyOut0=1) or (DecSub & SubCyOut0=0)

F3: (DecAdd & AddCyOut1=0) or (DecSub & SubCyOut1=1)

F4: (DecAdd & AddCyOut1=1) or (DecSub & SubCyOut1=0)

The signals F1–F4 are used to perform a pre-selection of the pre-sums by means of multiplexers M50 and M60. Multiplexer M50 receives the bits of PreSum0 of a decimal addition from pre-sum logic PS20 through an AND-circuit 66, and the bits of PreSum0 of a decimal subtraction from pre-sum logic PS10 through an AND-circuit 65. The signal F1 is applied to the second input of AND-circuit 65 to pass the PreSum0 from pre-sum logic PS10 to the output of multiplexer M50. Similarly, the signal F2 is applied to the second input of AND-circuit 66 to pass the PreSum0 from pre-sum logic PS20 to the output of multiplexer M50.

Multiplexer M60 receives the bits of PreSum1 of a decimal addition from pre-sum logic PS20 through an AND-circuit 68, and from pre-sum logic PS10 the bits of PreSum1 of a decimal subtraction through an AND-circuit 67. The signal F3 is applied to the second input of AND-circuit 67 to pass the PreSum1 from pre-sum logic PS10 to the output of multiplexer M60. Similarly, the signal F4 is applied to the second input of AND-circuit 68 to pass the PreSum1 from pre-sum logic PS20 to the output of multiplexer M60. The Multiplexer M50 and M60 thus perform by means of the function signals F1–F4 a pre-selection among the four pre-sums produced by pre-sum logic circuit blocks PS10 and PS20 without any interaction of outputs from the digits carry network C1.

A multiplexer M70 selects one of the pre-sums gated through the multiplexers M50 and M60 as the correct sum or difference. This selection depends on the carry-in signals DCyIn3 from the digit carry network C1. In FIG. 2 the signal DCyIn3 is the hot carry-in into the high order digit. If DCyIn3=1, the pre-sum from the output of multiplexer M60 is selected by multiplexer M70 through AND-circuit 72 and gated to the sum output 75 as the correct SUM(0–3) of the high order of digit position. If on the other hand CyIn3=0, the pre-sum from the output of multiplexer M50 is selected by multiplexer M70 through inverter 73 and AND-circuit 74 and gated to the sum output 75 as the correct SUM(0–3) which in fact is the difference of the operands A, B in the high order digit position.

Figure 5:
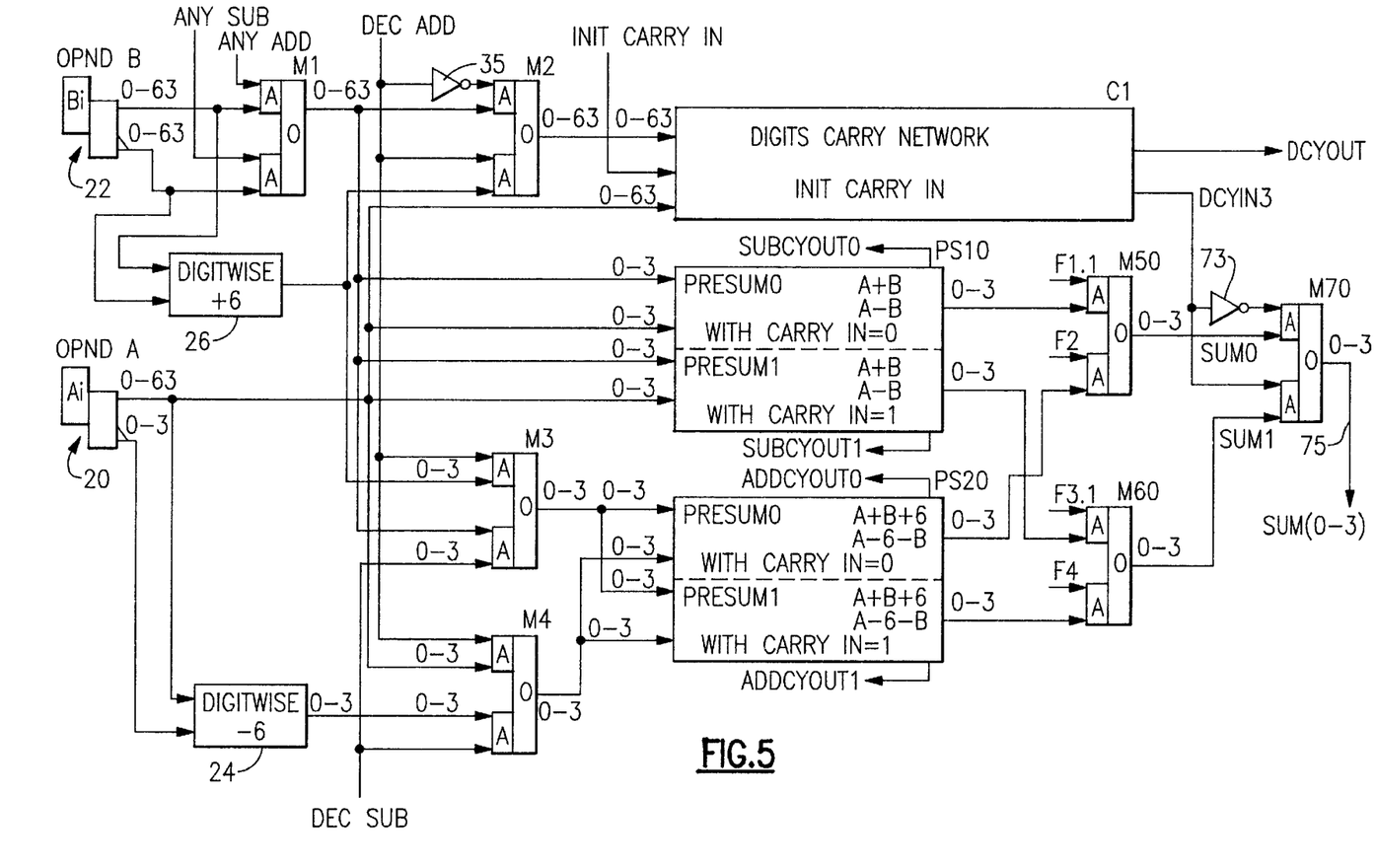
FIG. 5 a block diagram of a binary and decimal adder unit according to the first embodiment of the invention.

While the adder unit shown in FIG. 2 performs decimal additions and subtractions only, the adder unit of FIG. 5 according to the invention performs decimal additions and subtractions as well as binary additions and subtractions without any additional delay. For this purpose the adder unit of FIG. 2 comprises a modification to the extent that logic circuit block 60 (FIG. 4) generating the function signals F1–F4 is modified by involving into the generation of the function signals F1 and F3 also an binary add/sub operation control signal BinAddSub which is present instead of the operation control signals DecAdd and DecSub when a binary addition or subtraction has to be performed. Logic circuit block 60 is thus modified as follows:

F1 .1: (DecAdd & AddCyOut0=0) or (DecSub & SubCyOut0=1) or BinAddSub

F2: (DecAdd & AddCyOut0=1) or (DecSub & SubCyOut0=0)

F3.1: (DecAdd & AddCyOut1=0) or (DecSub & SubCyOut1=1) or BinAddSub

F4: (DecAdd & AddCyOut1=1) or (DecSub & SubCyOut1=0)

These modifications are in FIG. 4 indicated by the terms in brackets. FIG. 5 shows the binary and decimal adder unit according to the invention using the function signals F1.1 and F3.1. The operation of this adder unit corresponds to that one of FIG. 2 as described above.

Figure 6:
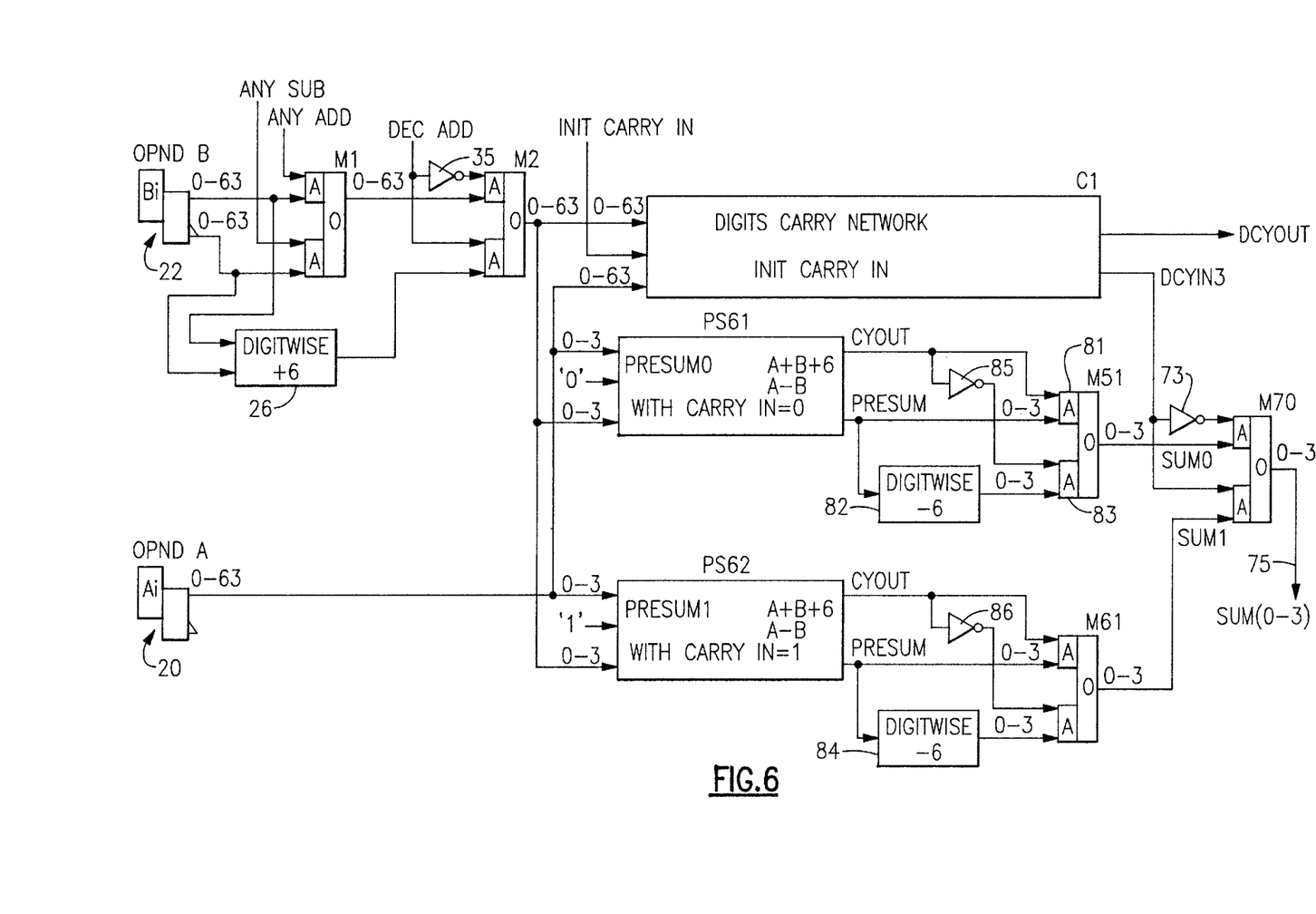
FIG. 6 a block diagram of a decimal adder unit according to another embodiment of the invention.
Figure 7:
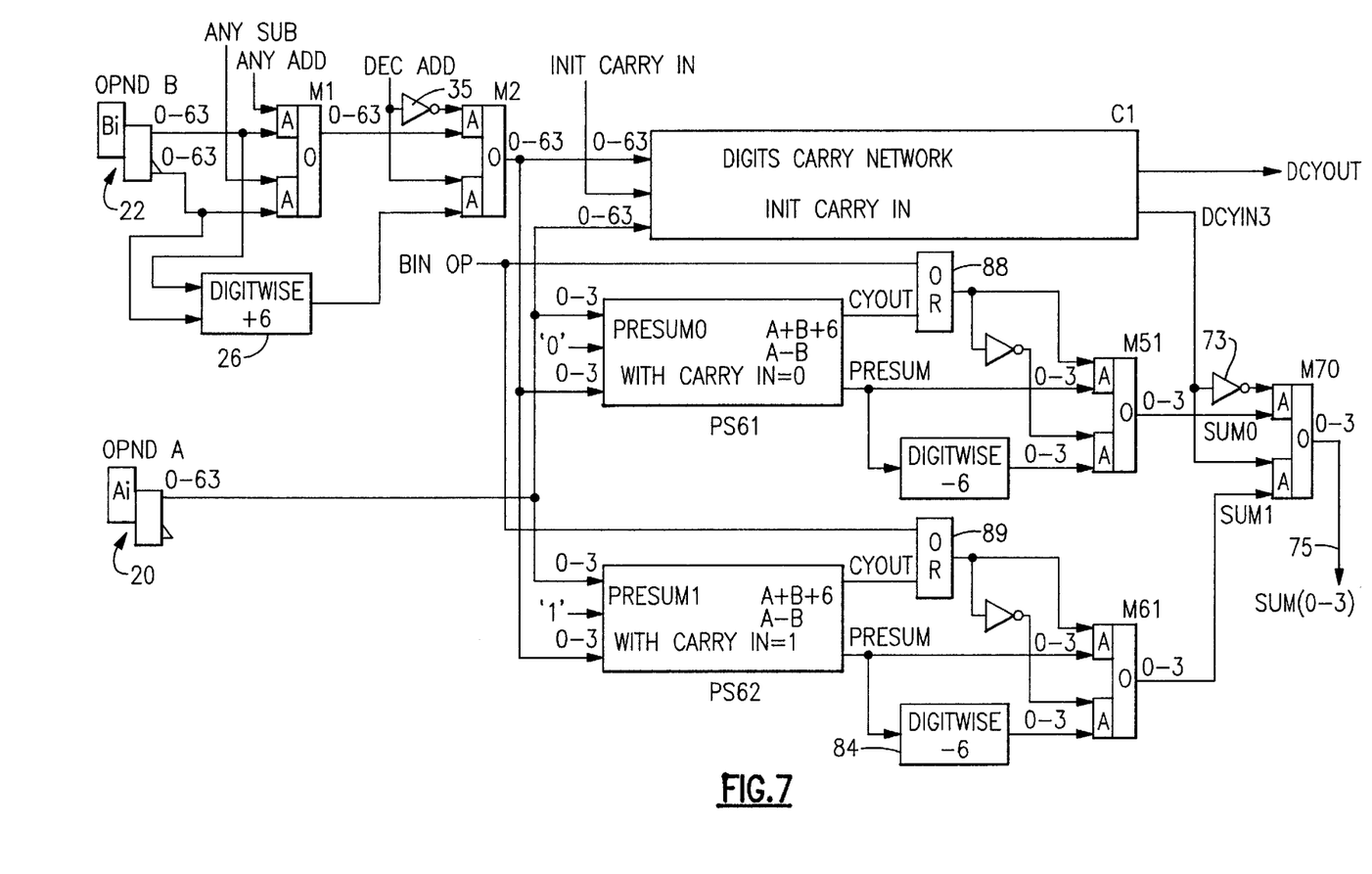
FIG. 7 a block diagram of an extended binary and decimal adder unit according to the embodiment of FIG. 6.

FIGS. 6 and 7 show another embodiment of the invention which includes a reduced expenditure of circuits and thus occupying smaller chip space. The adder units of FIGS. 6 and 7 are based on the presumption that SUM0 and SUM1 can be generated before the gating carry from the digits carry network C1 is available. FIG. 6 shows the high order digit position of a decimal adder unit. Circuit components of FIG. 6 which correspond to circuit components of FIG. 2 are designated with identical reference numbers as used in FIG. 2. In the adder unit of FIG. 6 the digitwise −6 correction is performed after the pre-sums are generated. For this purpose operand A register 20 is directly connected to the digits carry network C1 and to pre-sum logic blocks PS61, PS62 while operand B is supplied in its true, complemented or incremented version as described with reference to FIG. 2. The pre-sum logic blocks PS61 and PS62 jointly correspond to the circuits shown in FIG. 3. Each of the pre-sum logic blocks PS61 and PS62 generates a digit pre-sum PreSum and a carry-out CyOut as described with reference to the carry logic blocks CP10.1 and CP10.2 and the raw sum block RS10 of FIG. 3. The pre-sum logic block PS61 operates on the presumption that the input carry into the digit position is zero, and the pre-sum logic block PS62 operates on the presumption that the input carry into the digit position is one. The CyOut signals correspond to the carry-out signals on lines 53 and 54 and are generated according to the equations Eq5 and Eq14.

Multiplexers M51 and M61 perform a pre-selection among the pre-sums generated by the pre-sum logic blocks PS61 and PS62. The multiplexer M51 receives from pre-sum logic PS61 the PreSum bits and the carry-out signal CyOut through an AND-circuit 81 to gate the pre-sum to the multiplexer M70. A minus six decrementer 82 is connected to the PreSum output of logic block PS61. The output of the decrementer 82 is applied through an AND-circuit 83 to the multiplexer M51 which is controlled by the carry-out signal CyOut through an inverter 85 to gate the corrected pre-sum to the multiplexer M70 if CyOut=0. Similarly, multiplexer M61 receives from pre-sum logic PS62 the carry-out signal CyOut to gate PreSum from logic PS62 to the multiplexer M70. A minus six decrementer 84 is connected to the PreSum output of logic PS62. The output of the decrementer 84 is applied to the multiplexer M61 which is controlled by the carry-out signal CyOut through an inverter 86 to gate the corrected pre-sum to the multiplexer M70 if CyOut=0. The decrementers 82 and 84 perform a correction of the pre-sums according to the rules of the decimal addition and subtraction. The circuit expenditure of the pre-sum logic blocks PS61 and PS62 corresponds to only one of the pre-sum logic blocks PS10 or PS20 in FIG. 2 while the circuitry of the second block is saved.

The operation of multiplexer M70 corresponds to that one of multiplexer M70 in FIG. 2 by selecting one of the pre-sums gated through the multiplexers M51 and M61 as the correct sum or difference and to gate the selected sum it to output line 75. The selection depends on the carry-in signals DCyIn3 from the digits carry network C1 as described with reference to FIG. 2.

The adder unit shown in FIG. 6 performs decimal additions and subtractions. An extension of that unit to a combined binary and decimal adder unit shows FIG. 7. An operation control signals BinOp, which is generated instead of the operation control signals DecAdd and DecSub to request a binary addition or subtraction, is applied to OR-circuits 88 and 89. Second inputs of each of the OR-circuits 88, 89 are formed by the carry-out signals CyOut of the pre-sum logic blocks PS61 and PS62. The output signal of each of the OR-circuits 88 and 89 control either directly or via inverter 85 or 86, respectively, the multiplexers M51, M61 for a preselection of the sums generated by the blocks PS61 and PS62.

The adder units as described with reference to the FIGS. 2–7 my be modified by extending said pre-sum logic PS10, PS20, PS61, PS62 including said carry prediction logic CP10.1, CP10.2, and said sum selection logic M50, M60, M70 including said pre-selection function to the length of a byte comprising two decimal digit positions. In such modification, the pre-sum generation, the carry prediction and the carry-in signals from the digits carry network C1 extends to the 8 bit positions of a byte while the six correction operations are performed for each of the two decimal digits contained in a byte.

While the invention is described with reference to preferred embodiments, further modifications or other embodiments of the invention are within the scope of the invention as defined in the claims.

What is claimed is:

1. A binary and decimal adder unit for processing a plurality of binary or decimal digits with a sum logic for generating binary rough sums of each decimal digit and with a digits carry network (C1) for generating binary carries within the decimal digit positions and a high order carry-out signal of the high order digit position, each decimal digit position of said adder unit comprises a correction logic for performing a six correction, said sum logic comprises a pre-sum logic for generating in each of the decimal digit positions first pre-sums of the operands under the presumption of a carry-in of zero and second pre-sums of the operands under the presumption of a carry-in of one, and said adder unit further comprises a sum selection logic responsive to carry signals from the digit carry logic (C1) and to operation control signals (DEC ADD, DEC SUB) for selecting one of the pre-sums as the correct sum of the digit position, characterized in that:

(a) said pre-sum logic (PS10, PS20) comprises a carry prediction logic (CP10.1, CP10.2) which generates decimal digit position carry-out signals on the presumption that carry inputs into the decimal digit position are zero or one;

(b) said sum selection logic comprises pre-selection circuits (M50, M60) responsive to gating function signals (F1–F4) derived from said carry-out signals of said carry prediction logic (CP10.1, CP10.2) and said operation control signals (DEC ADD, DEC SUB) for selecting two of said pre-sums generated by the pre-sum logic (PS10, PS20) as qualified pre-sums;

(c) said selection logic further comprises a two way selector (M70) responsive to a digit carry-in signal from the digits carry network (C1) for selecting one of said qualified pre-sums supplied by the pre-selection circuits (M50, M60) as the correct sum of the digit position.

2. An adder unit according to claim 1, wherein said pre-sum logic comprises:

(a1) a first pre-sum logic circuit block (PS10) for generating a sum or difference of uncorrected operands in each of the decimal positions under the presumption of a zero carry input into the decimal position, and generating a sum or difference of the uncorrected operands in each of the decimal positions under the presumption of a one carry input into the decimal position;

(a2) a second pre-sum logic circuit (PS20) for generating a sum or difference of six corrected operands in each of the decimal positions under the presumption of a zero carry input into the decimal position, and a sum or difference of the six corrected operands in each of the decimal positions under the presumption of a one carry input into the decimal position; and wherein said pre-selection logic (M50, M60) is arranged for selecting one of the pre-sums generated by said first pre-sum logic circuit (PS10) and one of the pre-sums generated by said second pre-sum logic circuit (PS20) as qualified pre-sums.

3. An adder unit according to claim 1, wherein said two way selector (M70) includes a first input at which the qualified pre-sum from said first pre-sum logic circuit (PS10) is received to be gated to the sum output (75) when said digits carry network (C1) indicates no carry into the digit position, and further includes a second input on which the qualified pre-sum from said second pre-sum logic circuit (PS20) is received to be gated to the sum output when said digit carry network (C1) indicates a carry into the digit position.

4. An adder unit according to claims 1, characterized by a gating function signal logic (60) which generates gating signals (F1–F4) by an AND connection of the carry-out signals from said carry prediction logic (CP10.1, CP10.2) of said pre-sum logic circuits (PS10, PS20) with a decimal add control signal and with a decimal subtract control signal, and by an OR connection between the results of both AND connections.

5. An adder unit according to claim 4, wherein said gating function signal logic comprises an OR connection of the results of both AND connections with a binary addition and subtract operation control signal to generate gating function signals (F1.1, F3.1) which are applied to said multiplexer (M50, M60) for selecting one of the pre-sums generated by said first pre-sum logic circuit (PS10) and one of the pre-sums generated by said second pre-sum logic circuit (PS20) as qualified pre-sums of a binary addition and subtraction.

6. An adder unit according to claim 1, comprising an operand modification and selection logic (M1, M2, 26) assigned to one of the operand inputs to pass the true operand (B), its complement or its six incremented version to said digits carry network (C1) and to said pre-sum logic circuits (PS61, PS62), and wherein the other operand input (A) is directly connected to said digits carry network (C1) and to said pre-sum logic circuits (PS61, PS62).

7. An adder unit according to claim 6, wherein said pre-sum logic comprises:

(a3) a first pre-sum logic circuit (PS61) for generating a sum of the uncorrected operand and the six incremented operand and a difference of the uncorrected operands in each of the decimal digit positions under the presumption of a zero carry input into the decimal digit position;

(a4) a second pre-sum logic circuit (PS62) for generating a sum of the uncorrected operand and the six incremented operand and a difference of the uncorrected operands in each of the decimal digit positions under the presumption of a one carry input into the decimal digit position;

(a5) a pre-sum modification logic (82, 84) which applies a six decrement operation to the pre-sum outputs of said first pre-sum logic circuit (PS61) and said second pre-sum logic circuit (PS62);

wherein said pre-selection logic (M51, M61) is arranged for selecting the unmodified or the decremented pre-sum from said first pre-sum logic circuit (PS61) and from said second pre-sum logic circuit (PS62) as qualified pre-sums.

8. An adder unit according to claim 7, wherein said pre-selection logic comprises OR circuits (88, 89) to connect said carry-out signals (CyOut) of the pre-sum logic circuits (PS61, PS62) with a binary operation control signal (BinOp) to control the pre-selection of the unmodified or the decremented pre-sum from said pre-sum logic circuits (PS61, PS62) as qualified pre-sums of a binary addition or subtraction.

9. An adder unit according to claim 6, wherein said operand modification and selection logic comprises a first multiplexer (M1) controlled by addition and subtraction control signals (ANY ADD, ANY SUB) for selecting said one operand (B) as true operand or as its complement or as a six incremented version (B+6), a second multiplexer (M2) controlled by decimal addition control signals (DEC ADD) to pass the operand version selected to said digit carry network (C1) and to said pre-sum logic circuits (PS61, PS62).

10. An adder unit according to claim 1, wherein said pre-sum logic (PS10, PS20) including said carry prediction, and said sum selection logic (M50, M60, M70) including said pre-selection function are extended to the byte length wherein each byte comprises two decimal digit positions.

11. A method for performing binary and decimal additions of a plurality of binary or decimal digits in a adder unit with a sum logic for generating binary rough sums of each decimal digit and with a digits carry network (C1) for generating binary carries within the decimal digit positions and a high order carry-out signal of the high order digit, each decimal digit position of said adder unit comprises a correction logic for performing a six correction, the method comprising the steps of generating in each of the decimal digit positions first pre-sums of the operands under the presumption of a carry-in of zero and second pre-sums of the operands under the presumption of a carry-in of one, and selecting one of the pre-sums as the correct sum of the digit position in response to carry signals from the digit carry logic (C1) and operation control signals (DEC ADD, DEC SUB), characterized by the steps:

(a) performing within said pre-sum generation a carry prediction (CP10.1, CP10.2) in each decimal digit position to generate carry-out signals on the presumption that carry inputs into the decimal digit position are zero or one;

(b) pre-selecting in response to said carry-out signals and said operation control signals two of said pre-sums generated by the pre-sum logic (PS10, PS20) as qualified pre-sums;

(c) selecting in response to a digit carry-in signal from the digits carry network (C1) into the digit position one of said qualified pre-sums as the correct sum of the digit position.

12. A method according to claim 11, wherein said pre-sum generation step comprises the steps:

(a1) generating a sum or difference of true operands in each of the decimal positions under the presumption of a zero carry input into the decimal position, and generating a sum or difference of the uncorrected operands in each of the decimal positions under the presumption of a one carry input into the decimal position;

(a2) for generating a sum or difference of six corrected operands in each of the decimal positions under the presumption of a zero carry input into the decimal position, and a sum or difference of the six corrected operands in each of the decimal positions under the presumption of a one carry input into the decimal position; and wherein said pre-selection step comprises the step of:

(b1) selecting one of the sum or differences generated by step (a1) and one of the sums or differences generated by step (a2) as qualified pre-sums.

13. A method according to claim 12, wherein said pre-sum generation step comprises the steps of:

(a3) generating a sum of the uncorrected operand and the six incremented operand and a difference of the uncorrected operands in each of the decimal digit positions under the presumption of a zero carry input into the decimal digit position;

(a4) generating a sum of the uncorrected operand and the six incremented operand and a difference of the uncorrected operands in each of the decimal digit positions under the presumption of a one carry input into the decimal digit position;

(a5) modifying each of the pre-sums generated in steps (a3) and (a4) by a six decrement operation;

wherein said pre-selection step (b) comprises the step of selecting one of the unmodified or the decremented pre-sums from steps (a3) and (a5) and one of the unmodified or the decremented pre-sums from steps (a4) and (a5) as qualified pre-sums.

14. A method according to claim 13, wherein said pre-selection step comprises an OR connection of said carry-out signals (CyOut) of said pre-sum generation step with a binary operation control signal (BinOp) to control the pre-selection of the unmodified or the decremented pre-sum from said pre-sum generation step as qualified pre-sums of a binary addition or subtraction.

15. A method according to claims 11, wherein said selection step (c) includes the steps of passing one of the qualified pre-sums to the sum output (75) when said digits carry network (C1) indicates no carry into the digit position, and passing the other one of the qualified pre-sums to the sum output (75) when said digits carry network (C1) indicates a carry into the digit position.

16. A method according to claims 11, comprising the step of generating gating signals (F1–F4) by AND connecting the carry-out signals from said carry prediction step (a) with a decimal add control signal and with a decimal subtract control signal, and by OR connecting the results of both AND connections.

17. A method according to claims 11, wherein said gating function signal generating step comprises an OR connection of the results of both AND connections with a binary addition and subtract operation control signal to generate gating function signals (F1.1, F3.1) which are applied to said pre-selection step for selecting one of the pre-sums generated in steps (a1) and (a2) as qualified pre-sums of a binary addition and subtraction.

18. A method according to claim 11, comprising the steps of modifying and selecting one of the operand inputs to pass the true operand (B), its complement or its six incremented version to said digits carry network (C1) and to said pre-sum generation step, and supplying the other operand input (A) directly to said digits carry network (C1) and to said pre-sum generation step.

19. A method according to claim 18, wherein said operand modification and selection step comprises the steps of selecting said one operand (B) as true operand or as its complement or as a six incremented version (B+6) and passing the operand version selected to said digit carry network (C1) and to said pre-sum generation step in response to addition and subtraction control signals (ANY ADD, ANY SUB).

20. A method according to claim 11, wherein said pre-sum generation steps including said carry prediction steps, and said sum selection steps including said pre-selection steps are extended to a byte length wherein each byte comprises two decimal digit positions.

* * * * *